(12) United States Patent
Gan et al.

(10) Patent No.: US 7,518,263 B2
(45) Date of Patent: Apr. 14, 2009

(54) TIME DELAY CONTROL SCHEME FOR A POWER SUPPLY WITH MULTIPLE OUTPUTS

(75) Inventors: Hongjian Gan, Taoyuan Hsien (TW);
Huijie Xue, Taoyuan Hsien (TW);
Chaoqun Sun, Taoyuan Hsien (TW);
Alpha J. Zhang, Taoyuan Hsien (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 447 days.

(21) Appl. No.: 10/823,489

(22) Filed: Apr. 12, 2004

(65) Prior Publication Data

US 2005/0225176 A1    Oct. 13, 2005

(51) Int. Cl.
*H02J 3/14* (2006.01)
*H02J 3/12* (2006.01)

(52) U.S. Cl. ............................ 307/32; 323/244; 323/267
(58) Field of Classification Search ................. 323/267, 323/244; 307/31, 34, 32
See application file for complete search history.

(56) References Cited

U.S. PATENT DOCUMENTS

| | | | | |
|---|---|---|---|---|
| 5,400,239 A * | 3/1995 | Caine | ............................ | 363/67 |
| 5,617,015 A * | 4/1997 | Goder et al. | ................. | 323/282 |
| 6,067,241 A | 5/2000 | Lu | ................................ | 363/65 |
| 6,344,979 B1 * | 2/2002 | Huang et al. | ................... | 363/16 |
| 6,549,432 B1 * | 4/2003 | Giannopoulos et al. | .. | 363/21.14 |
| 6,552,917 B1 * | 4/2003 | Bourdillon | ................ | 363/21.12 |
| 6,664,657 B2 * | 12/2003 | Hailey | .......................... | 307/52 |
| 6,771,052 B2 * | 8/2004 | Ostojic | ........................ | 323/266 |

OTHER PUBLICATIONS

AV45C Quarter-Brick Series Technical Reference Notes, ASTEC, REV 1 pp. 1-25.*

* cited by examiner

*Primary Examiner*—Albert W Paladini
*Assistant Examiner*—Michael Rutland Wallis
(74) *Attorney, Agent, or Firm*—J.C. Patents

(57) ABSTRACT

A time delay synchronous control scheme for a power supply, which has multiple outputs and tight output regulations, is provided. The switching mode power supply includes (1) a front-end DC/DC converter with current mode output, which can be a LLC Series Resonant converter (SRC) or a flyback converter; (2) one or several post buck converters directly cascaded from the output capacitor of the front-end DC/DC converter; (3) a new scheme of time delay synchronous control used to make the post buck synchronize and modulate from the front-end LLC-SRC or flyback converter. The proposed time delay synchronous control circuit can eliminate the conventional input filter of the post buck converters, as well as reduce the ripple current on the output capacitor of the front-end DC/DC converter, as a result of which, a high efficiency for the overall architecture can be obtained.

22 Claims, 10 Drawing Sheets

TIME DELAY CONTROL SCHEME FOR A POWER SUPPLY WITH MULTIPLE OUTPUTS

BACKGROUND OF THE INVENTION

1. Field of the Invention

The present invention relates to a control scheme for a power supply, and more specifically to a time delay synchronous control scheme for a power supply, which has multiple outputs and tight output regulations.

2. Description of the Related Art

In the design of switching mode power supplies (SMPS) with multiple outputs, it is important to meet the requirements for the cross regulation of the multiple outputs. Additionally, with the development of the SMPS, it is imperative to consider high efficiency and low cost.

FIG. 1 illustrates a block diagram of the conventional implementation for SMPS with multi-outputs. This implementation includes a front-end DC/DC converter 1 and is cascaded with two post buck converters 2 and 3. One of the outputs is achieved as Vo3 directly from the front-end DC/DC converter 1. Both of the post buck converters 2 and 3 have an input filter with a LC structure, cascading the output capacitor Cf of the front-end DC/DC converter 1.

The conventional SMPS as shown in FIG. 1 can achieve tight multiple output regulations because the front-end DC/DC converter 1 and the post buck converters 2 and 3 operate respectively and independently. However, the additional cost of the input filters of the post buck converters 2 and 3 are not what was anticipated. Furthermore, although the input filter is added for each of the post buck converters 2 and 3, a ripple current with a considerable rms (root mean square) value is still obtained on the output capacitor Cf of the front-end DC/DC converter 1 because of the inherent pulsating input traits of the post buck converters 2 and 3. This will significantly increase the current stress and the loss dissipated on the output capacitor. To alleviate the pressure due to the loss rise, the use of a higher number of capacitors or alternatively, high quality capacitors are inevitable. This will lead to a higher cost for this architecture, especially in the case when the outputs have large output currents.

It is therefore attempted by the applicant to provide a new architecture with a new control scheme, which can overcome the defects of the prior art for SMPS with multiple output application.

SUMMARY OF THE INVENTION

A new power architecture used for a switching mode power supply (SMPS) with multiple outputs is thereby proposed in the present invention. It should be noted that the front-end DC/DC converter is specified as the one with a current mode output, which rectifies a pulse current to the output capacitor, such as a flyback converter. Additionally, unlike the prior art, the post buck converters directly cascade the output capacitor of the front-end DC/DC converter and the input filters of post buck converters are eliminated. A time delay synchronous control circuit is proposed in the SMPS of the present invention, which serves as the controller for the post buck converters. The proposed time delay synchronous control circuit at least has following functions. First, realize the synchronization of the front-end DC/DC converter and the post buck converters. Secondly, provide and modulate a pulse width of a drive signal for post buck converters to achieve tight multiple regulations. Thirdly, based on the principle to obtain a minimized rms value of a ripple current on the output capacitor, the delay time between the front-end DC/DC converter and the post buck converters can be controlled.

Thus, the post buck converter can directly draw the pulse input current at the time when the DC/DC converter has pulse output current to the output capacitor of the front-end DC/DC converter. Therefore, the high conversion efficiency can be anticipated due to low loss on the output capacitor $Cf_1$. Furthermore, the input filter in the prior art can be eliminated so as to achieve a relatively lower cost.

To achieve these and other advantages and in accordance with the purpose of the invention, as embodied and broadly described herein, the invention provides a time delay synchronous control scheme for a power supply with multiple outputs. The power supply includes a front-end converter with a current mode output and a first buck converter and a second buck converter. Both of the buck converters directly cascade the output capacitor of the front-end converter. In the time delay synchronous control scheme, a delay time between the time the front-end converter begins to have the pulse output current to its output capacitor and the time the first buck switch or the second buck switch is turned on is adjusted. Both of the first buck switch and the second buck switch draw pulsating input current during the time when the front-end converter has the pulse output current to its output capacitor.

In an alternative embodiment of the time delay synchronous control scheme, after the delay time behind the time when the front-end converter begins to provide the pulse output current, the first buck switch and the second buck switch are sequentially turned on and then the second buck switch is turned off before the first buck switch being turned off. In an embodiment, the first buck switch is turned off before the pulse output current of the front-end converter reaches to zero.

In an alternative embodiment of the time delay synchronous control scheme, after the delay time behind the time when the front-end converter begins to provide the pulse output current, the first buck switch is turned on and then the first buck switch is turned off. At the time the first buck switch being turned off, the second buck switch is sequentially turned on. In an embodiment, the second buck switch is turned off before the pulse output current of the front-end converter reaches to zero.

In an alternative embodiment of the time delay synchronous control scheme, if a zero current time interval exists between every two of the output current pulses of the front-end converter, the first buck switch and the second buck switch are sequentially turned on and then the first buck switch is turned off before the second buck switch being turned off. An overlap exists between the period of the first buck switch being on and that of the second buck switch being on.

To achieve these and other advantages and in accordance with the purpose of the invention, as embodied and broadly described herein, the invention provides a time delay synchronous control scheme for a power supply with multiple outputs. The power supply includes a front-end converter for sequentially providing a current mode output and a first buck converter and a second buck converter. Both of the first buck converter and the second buck converter cascade a first output capacitor of the front-end converter. The front-end converter is used for providing a first output of the power supply and the first buck converter and the second buck converter for providing a second output of the power supply. In the time delay synchronous control scheme, the first buck switch and the second buck switch alternative draw one of the two pulse currents from the first output capacitor during the time when every two pulses of the output current are provided.

In the above time delay synchronous control scheme, a delay time exists between the time the pulse output current of the front-end converter is provided and the time the first buck switch or the second buck switch is turned on. Both of the first and second buck switches are turned off before the pulse output current of the front-end converter reaches to zero. To achieve these and other advantages and in accordance with the purpose of the invention, as embodied and broadly described herein, the invention provides a time delay synchronous control scheme for a power supply with multiple outputs. The power supply includes a flyback converter with a diode rectifier or a synchronous rectifier and an output capacitor. The power supply further includes a buck converter, directly cascading the output capacitor of the flyback converter. In the time delay synchronous control scheme, the buck switch begins to turn on synchronously with the rectifier at the time the flyback converter turns off and turn off at the time before the time when the flyback converter turns on.

Both the foregoing general description and the following detailed description are exemplary and explanatory only and are not restrictive of the invention, as claimed.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
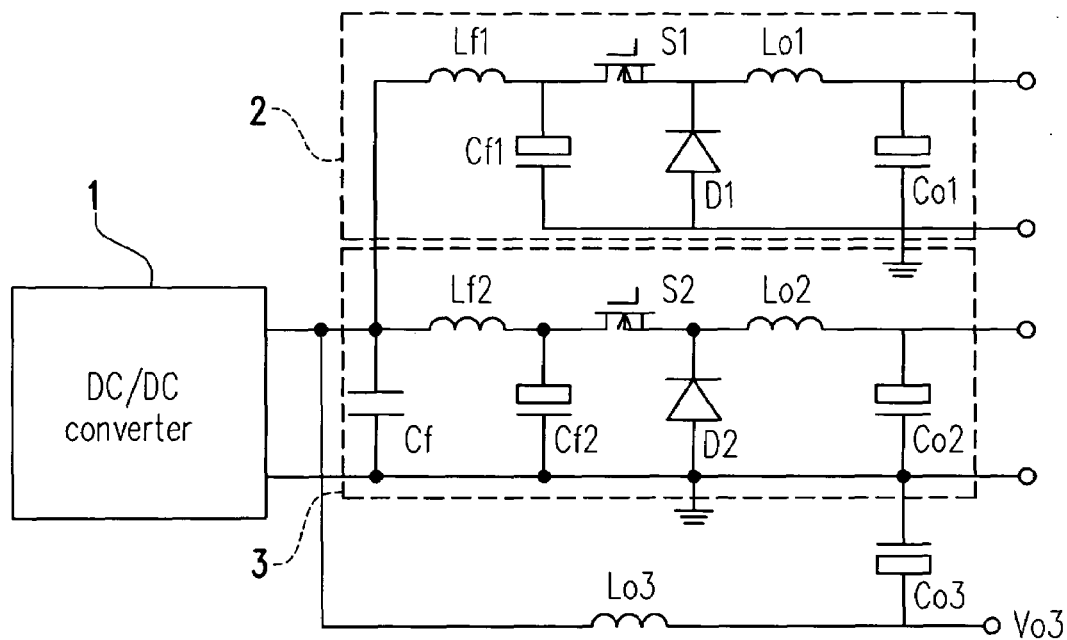
FIG. 1 illustrates a block diagram of a conventional implementation SMPS with buck converters as post voltage regulators.

Reference will now be made in detail to the present preferred embodiments of the invention, examples of which are illustrated in the accompanying drawings. Wherever possible, the same reference numbers are used in the drawings and the description to refer to the same or like parts.

A new power architecture used for a switching mode power supply (SMPS) with multiple outputs is thereby proposed in the present invention. It should be noted that the front-end DC/DC converter is specified as the one with current mode output. Additionally, unlike the prior art, the post buck converters are cascaded directly from the output capacitor of the front-end DC/DC converter and the conventional input filter of post buck converters are eliminated. A time delay synchronous control circuit is proposed in the SMPS of the present invention, which serves as the controller for the post buck converters. The proposed time delay synchronous control circuit at least has following functions. First, realize the synchronization of the front-end DC/DC converter and the post buck converters. Secondly, provide and modulate a pulse width of a drive signal for post buck converters to achieve tight multiple regulations. Thirdly, based on the principle to obtain a minimized rms value of a ripple current on the output capacitor, the delay time between the front-end DC/DC converter and the post buck converters can be controlled.

Thus, the post buck converter can directly draw the pulse input current at the time when the DC/DC converter has pulse output current to the output capacitor of the front-end DC/DC converter. Therefore, the high conversion efficiency can be anticipated due to low loss on the output capacitor $Cf_1$. Furthermore, the input filter in the prior art can be eliminated so as to achieve a relatively lower cost.

Figure 2:
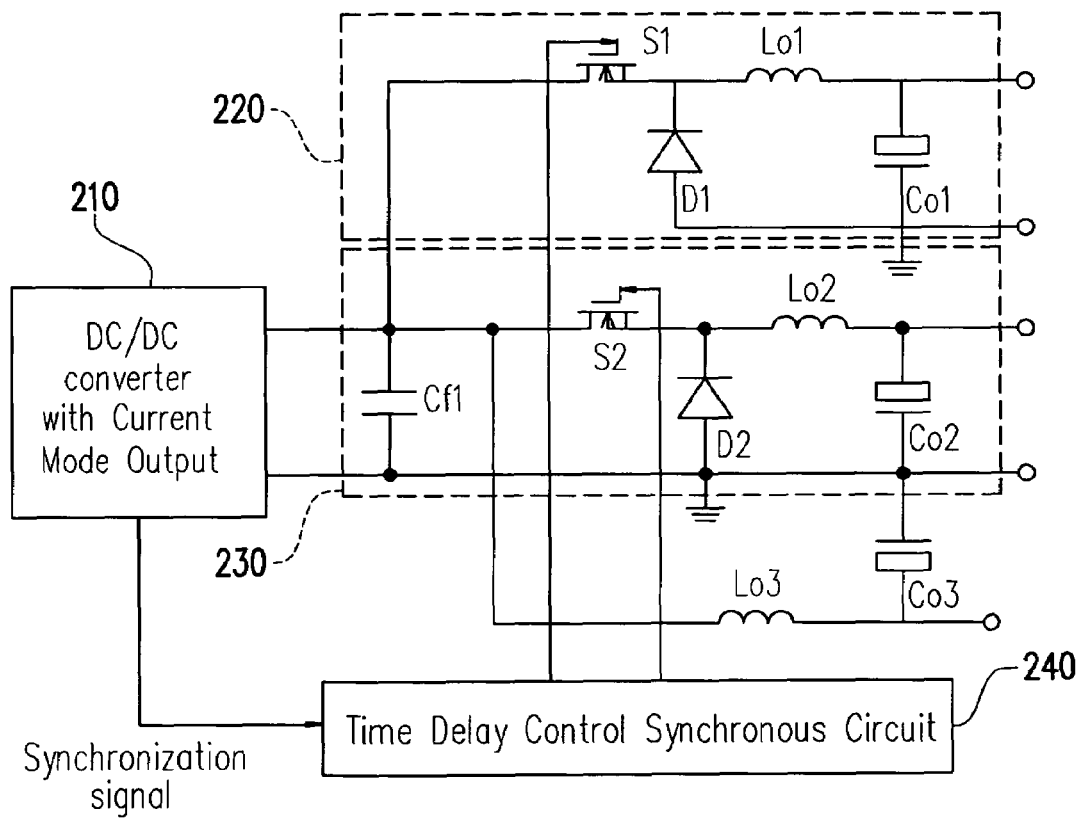
FIG. 2 illustrates a block diagram of the present invention with a time delay synchronous control circuit for the synchronous post buck converters.

In an alternative embodiment of the present invention, as shown in FIG. 2, which illustrates a block diagram of a switching mode power supply with a delay time control for the synchronous post buck converters. The architecture used for a switching mode power supply with multiple outputs includes a front-end DC/DC converter 210, two post buck converters 220 and 230, and a time delay synchronous control circuit 240. The front-end DC/DC converter 210 is specified as the one with current mode output. Unlike the conventional architecture, the two post buck converters 220 and 230 are cascaded directly from an output capacitor $Cf_1$ of the front-end DC/DC converter 210 and the input filters of post buck converters are eliminated.

The time delay synchronous control circuit 240 is proposed in the architecture of the SMPS of the present invention, which serves as the controller for the post buck converters. The proposed time delay synchronous control circuit 240 at least has following functions. First, realize the synchronization of the front-end DC/DC converter and the post buck converters. Secondly, provide and modulate a pulse width of a drive signal for post buck converters to achieve tight multiple regulations. Thirdly, based on the principle to obtain a minimized rms value of a ripple current on the output capacitor, the delay time between the front-end DC/DC converter and the post buck converters can be controlled.

Figure 3:
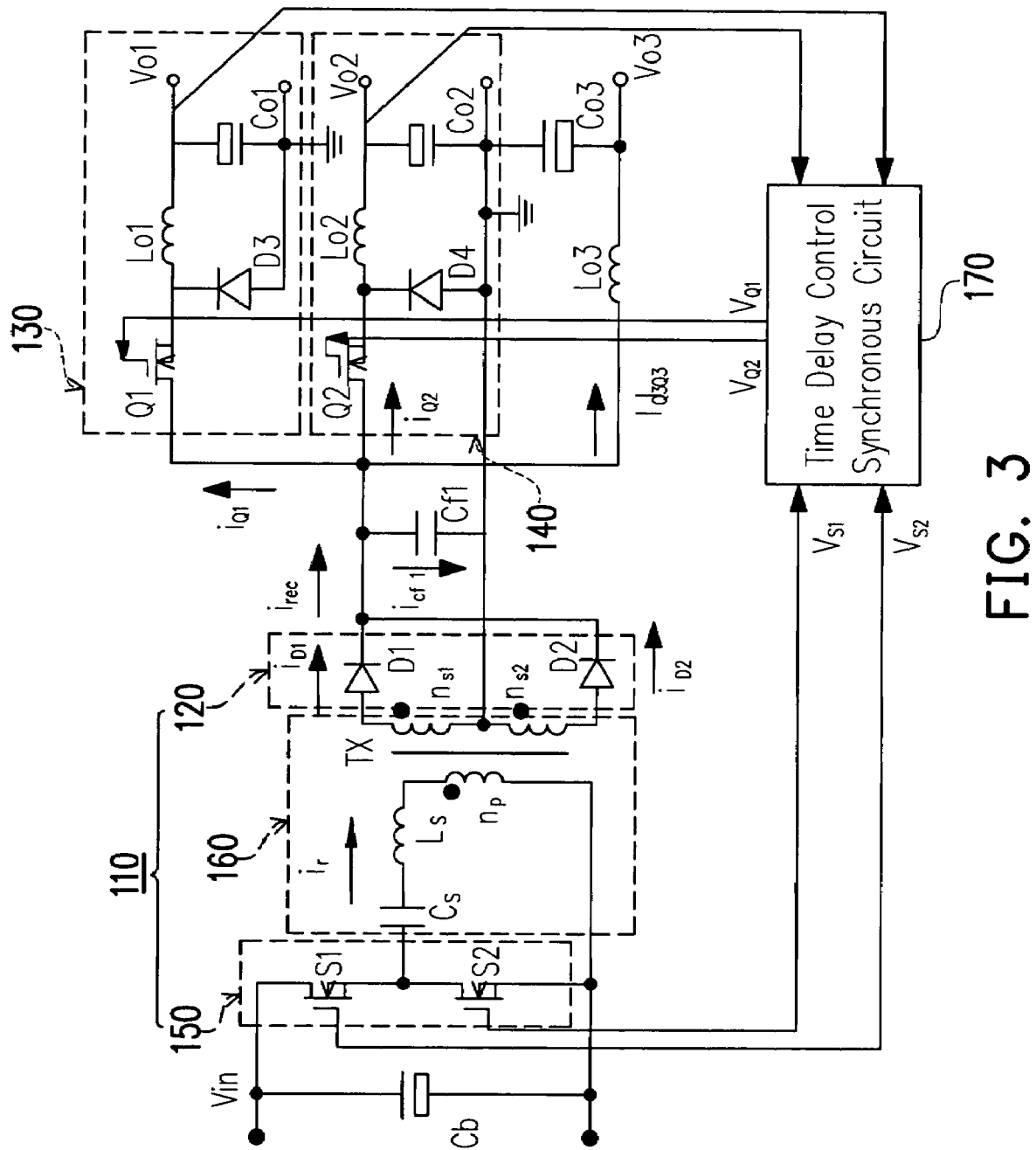
FIG. 3 illustrates an embodiment of the proposed power architecture, in which an LLC-SRC is used as the front-end DC/DC converter of FIG. 2.

In an alternative embodiment of the present invention, as shown in FIG. 3, a preferred embodiment of the proposed architecture is illustrated with an LLC-SRC (Series Resonant Converter, SRC) as the front-end DC/DC converter 210 of FIG. 2. To improve the poor regulation characteristics of the series resonant converter (SRC), if the magnetizing inductor of the transformer in SRC takes part in the resonance process, an LLC-SRC is obtained. In the proposed architecture, an LLC-SRC 110 employing a full-wave rectifier 120 is adopted as the front-end DC/DC converter and the time delay synchronous control circuit 170 is used to synchronize and modulate two post buck converters 130 and 140 to achieve tightly regulated multiple outputs. The LLC-SRC 110 includes a bridge circuit 150 including a pair of power switches $S_1$ and $S_2$ that drive a resonant tank 160 composed of a series resonant inductor Ls, a series resonant capacitor Cs and a magnetizing inductor Lm of a transformer TX. The series resonant inductor Ls can be discrete component or is replaced by leakage inductance of the transformer TX. The three resonant components constitute two characteristic frequencies $f_s$ and $f_m$ for the resonant LLC tank, which can be obtained using the following equations:

$$fs = \frac{1}{2\pi\sqrt{Ls \cdot Cs}} \quad (1)$$

$$fm = \frac{1}{2\pi\sqrt{(Ls + Lm) \cdot Cs}} \quad (2)$$

The half bridge circuit 150 is further illustrated with an input voltage Vin and a bus capacitor Cb. The transformer TX, including a primary winding $n_p$ and two secondary windings $n_{s1}$ and $n_{s2}$ connected in series in phase, isolates the bridge circuit 150 and the resonant tank 160 from the full-wave rectifier 120.

The full wave rectifier 120 comprises of a pair of rectifier diodes $D_1$ and $D_2$ connected to the output capacitor $Cf_1$. Cathodes of the rectifier diodes $D_1$ and $D_2$ are connected through the output capacitor $Cf_1$ to an output filter composed of $Lo_3$ and $Co_3$ to get an output Vo3. An anode of the rectifier diode $D_1$ is connected to a nominal terminal of the secondary winding $n_{s1}$ and an anode of the rectifier diode $D_2$ is connected to a reverse terminal of the secondary winding $n_{s2}$. A connection terminal of the windings $n_{s1}$ and $n_{s2}$ is connected to the output as the ground of the secondary side.

A power switch $Q_1$, a freewheeling diode $D_3$, an output inductor $Lo_1$ and an output capacitor $Co_1$ forms the post buck converter 130, which is directly cascaded from the output capacitor $Cf_1$. In addition, the output capacitor $Cf_1$ is directly cascaded with the other post buck converter 140 including a power switch $Q_2$, a freewheeling diode $D_4$, an output inductor $Lo_2$ and an output capacitor $Co_2$.

The LLC-SRC features that under appropriate parameter design, it can achieve Zero Voltage Switching (ZVS) for the primary side switches and Zero Current Switching (ZCS) for the secondary side switches.

Figure 4:
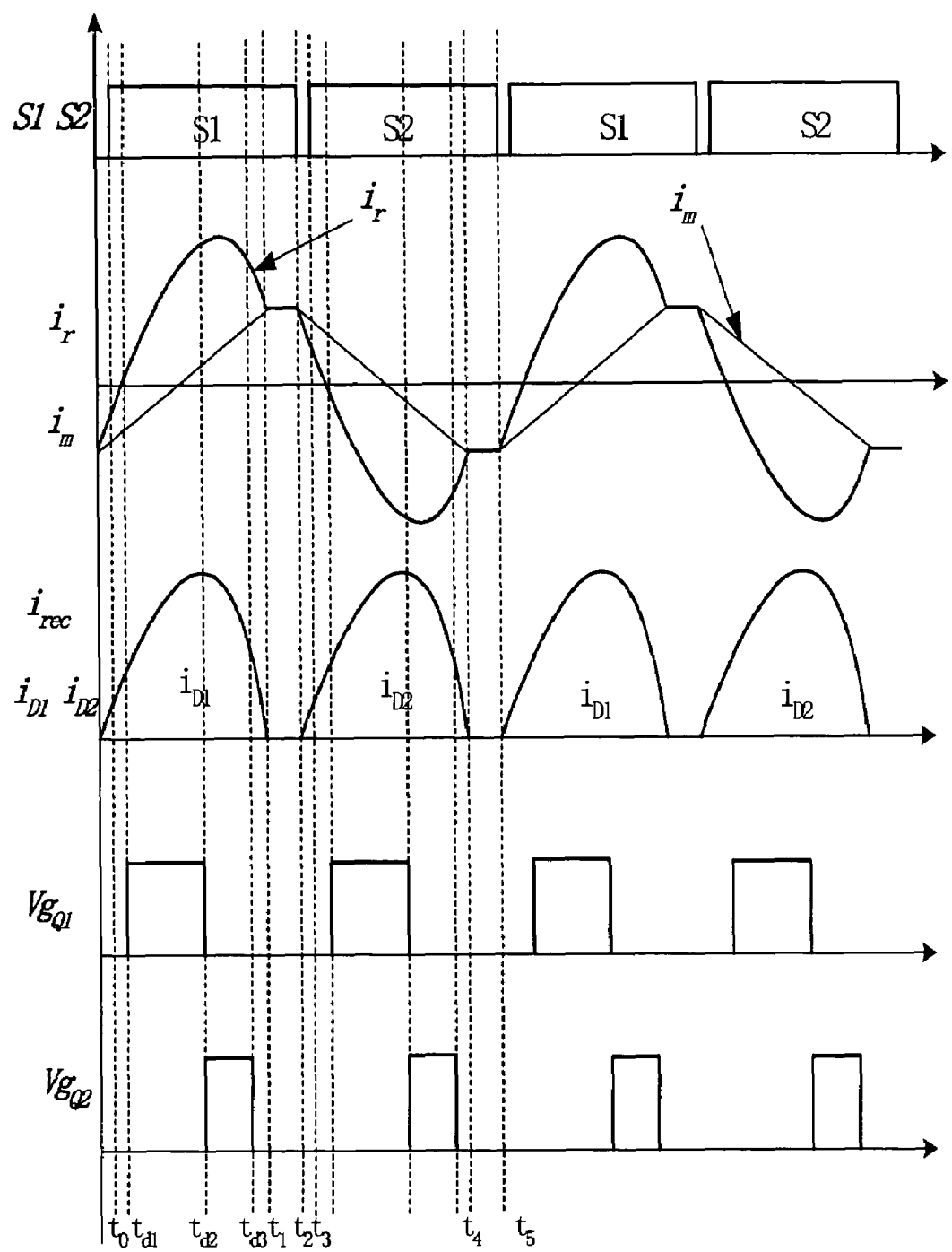
FIG. 4 illustrates an operation state of FIG. 3, and a timing sequence to show the time delay synchronous control thereof.

An operation state of LLC-SRC and the timing sequence of the time delay synchronous control is illustrated in FIG. 4. It occurs under influence of the switching frequency for switches $S_1$ and $S_2$ satisfying the following condition:

$$fm \leq f \leq fs \quad (3)$$

At $t=t_0$, because a primary current $i_r$ is negative, the main switch $S_1$ turns on under the ZVS condition. During the time period from $t_0$ to $t_1$, the rectifier diode $D_1$ draws the output current, which causes the voltage on the magnetizing inductor $L_m$ to be clamped to a constant value by the output voltage. Therefore, the magnetizing inductor $L_m$ does not take part in the resonant process and increases linearly during this period of time. Referring to FIG. 4, the current $i_{d1}$ in the rectifier diode $D_1$, is a quasi-sine shape due to the resonance of $L_s$ and $C_s$.

At $t=t_1$, since the switching period is longer than the resonant period of $L_s$ and $C_s$, $i_r$ drops and equals $i_m$ before the switch $S_1$ turns off. Therefore the rectifier diode $D_1$ stops drawing the output current. The resonance now happens through $C_s$, $L_s$, and $L_m$.

At $t=t_2$, the switch $S_1$ turns off. The body diode of the switch $S_2$ begins to conduct. At time at $t=t_3$, the switch $S_2$ turns on under ZVS condition.

The same operation process can be analysed in time intervals $t_3 < t < t_4$ and $t_4 < t < t_5$, for which the same operation state is achieved for the current $i_{d2}$ of the rectifier diode $D_2$ as shown in FIG. 4.

The sum of $i_{d1}$ and $i_{d2}$ constitutes a quasi-sine rectified current $i_{rec}$ that flows to one of the output Vo3 through the output capacitor $Cf_1$. If the LLC-SRC 110 operates at the switching frequency $f_s$, the dead time when either of the rectifier diodes $D_1$ and $D_2$ has conduction current, will be cancelled. Under such conditions, the current $i_{rec}$ will be in a rectified sine wave shape.

In the embodiment described in FIG. 3, the basic conception of the time delay synchronous control circuit 170 is to make sure the buck switches $Q_1$ and $Q_2$ of the post buck converters 130 and 140 draws pulse currents from the output capacitor $Cf_1$ only during the time when the diode $D_1$ or $D_2$ has conduction current. And through adjusting the delay time between the turn-on time of either diode of $D_1$ or $D_2$ and that of the post buck converters, the minimized rms ripple current for the output capacitor $Cf_1$ can be achieved. To explain further using FIG. 4, the time delay synchronous control circuit 170 aids in determining the turn-on time $t_{d1}$ of the switch $Q_1$, the turn-on time $t_{d2}$ of the switch $Q_2$, and to be certain of the turn-off time of the switch $Q_2$ before the turn-off time of $D_1$ $t_{d3}$.

Figure 5:
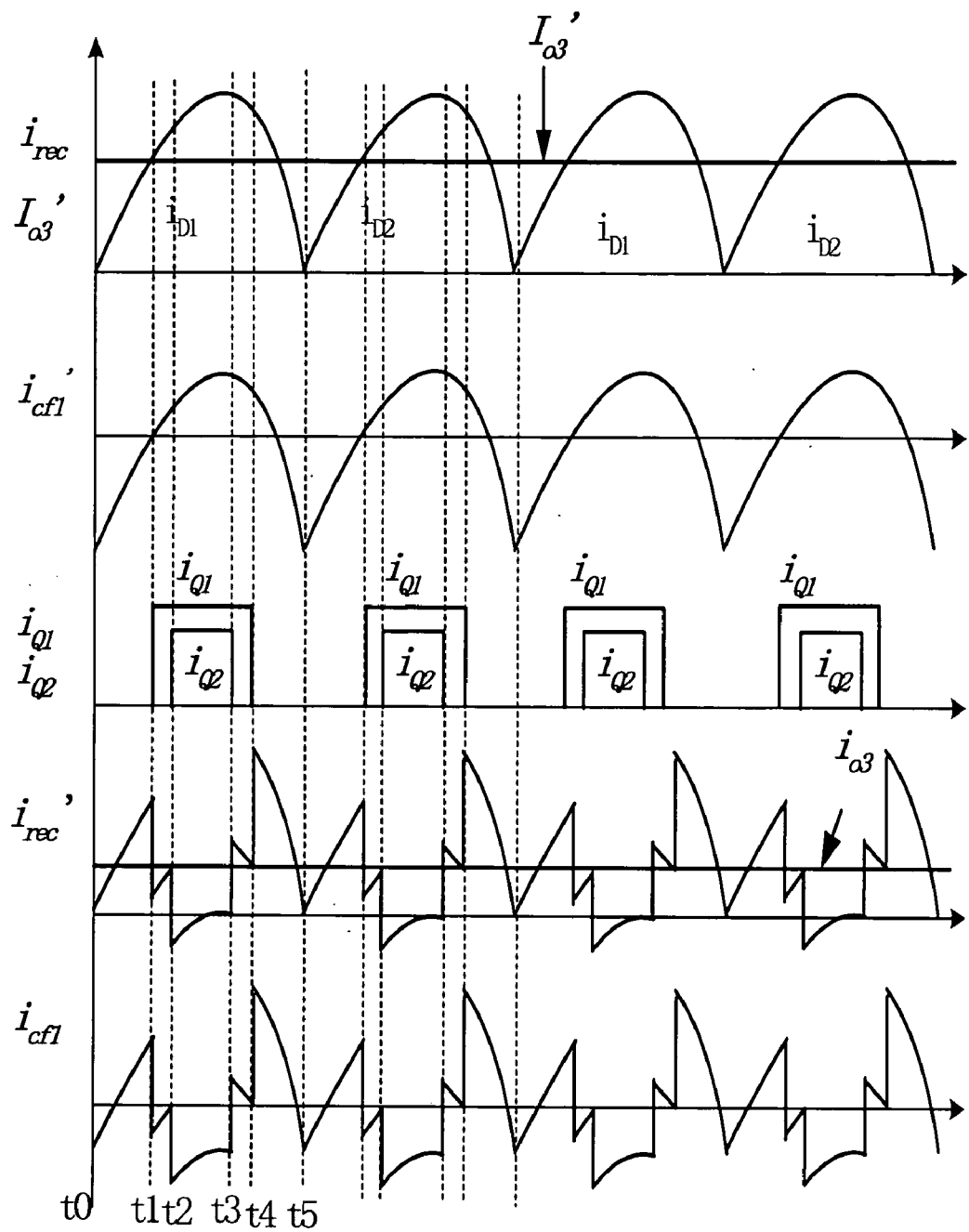
FIG. 5 illustrates a graphical representation of an alternative time delay synchronous control scheme of FIG. 3 and a current ripple reduction on the output capacitor of the LLC-SRC.

Refer to FIG. 5, which illustrates a principle and a process of ripple current reduction for the output capacitor $Cf_1$ according to an embodiment of the present invention. To illustrate with simplicity and clarity, the results of the analysis, the following deduction and calculation are based on the premise that the quasi-sine wave rectified current $i_{rec}$ is approximated to a sinusoidal shape and the LLC-SRC operates at the switching frequency fs. If the synchronous post buck converters do not work, there is only one output current $I_{o3}'$. Therefore, a ripple current $i_{cf1}'$ on the output capacitor $Cf_1$ is achieved by $i_{rec}$ minus $I_{o3}'$. The rms value of the ripple current $i_{cf1}'$ is obtained as:

$$I_{cf1,rms}' = \sqrt{I_{rec,rms}^2 - I_{o3}'^2} \quad (4)$$

Where $I_{rec,rms}$ is the rms value of $i_{rec}$ and can be expressed as:

$$I_{rec,rms} = \frac{\sqrt{2}}{2} I_{rec,p} \quad (5)$$

Where $I_{rec,p}$ is the peak current of $i_{rec}$.

Since, the current $i_{rec}$ is the average value of $i_{rec}$, $I_{rec,p}$ is rewritten as:

$$I_{rec,p} = \frac{\pi}{2} I_{o3}' \quad (6)$$

From equations (4), (5) and (6), the rms value of the ripple current $i_{cf1}'$ is expressed as:

$$I'_{Cf1,rms} = I'_{Po3}\sqrt{\frac{\pi^2}{8} - 1} = 0.483 I'_{o3} \quad (7)$$

It can be deduced from equation (7) and FIG. 5, that there exists large amplitude of the ripple current on the output capacitor $Cf_1$, if the time delay synchronous control scheme is not being used for the synchronous post buck converters. A ripple current with much higher amplitude than that shown in equation (7) also exists on the output capacitor $Cf_1$, which is found in the conventional SMPS implementation of FIG. 1. Since, the post buck converters have pulsating input currents. To reduce the ripple current on the output capacitor $Cf_1$, an alternative time delay synchronous control scheme for the synchronous post buck converters of FIG. 3 is illustrated in FIG. 5.

The buck switch $Q_1$ is set to turn on at time $t_1$ with a delay time behind the time $t_0$ when the current $i_{rec}$ begins to increase from zero. Then at time $t_2$, the buck switch $Q_2$ turns on. The switch $Q_2$ turns off at $t=t_3$ before the time $t_4$ when the buck switch $Q_1$ turns off. And the buck switch $Q_1$ turns off before the time $t_5$ when the current $i_{rec}$ decreases to zero. From the onset of time $t_4$, the same switching process occurs for the switches $Q_1$ and $Q_2$ in another half-wave of $i_{rec}$. Therefore, the switching frequency of the switches $Q_1$ and $Q_2$ is double of that of the LLC-SRC.

From FIG. 5, it can be observed that, after currents are drawn by the switches $Q_1$ and $Q_2$ during every half wave of $i_{rec}$, a current with abundant high order harmonics $i_{rec}'$ is left to supply the third output $I_{o3}$ through the output capacitor $Cf_1$. Separated from the DC component $I_{o3}$, an AC ripple current $i_{cf1}$ is achieved from $i_{rec}'$ on the capacitor $Cf_1$. Compared with the former $i_{cf1}'$, this ripple current has a significantly reduced rms value.

Figure 6:
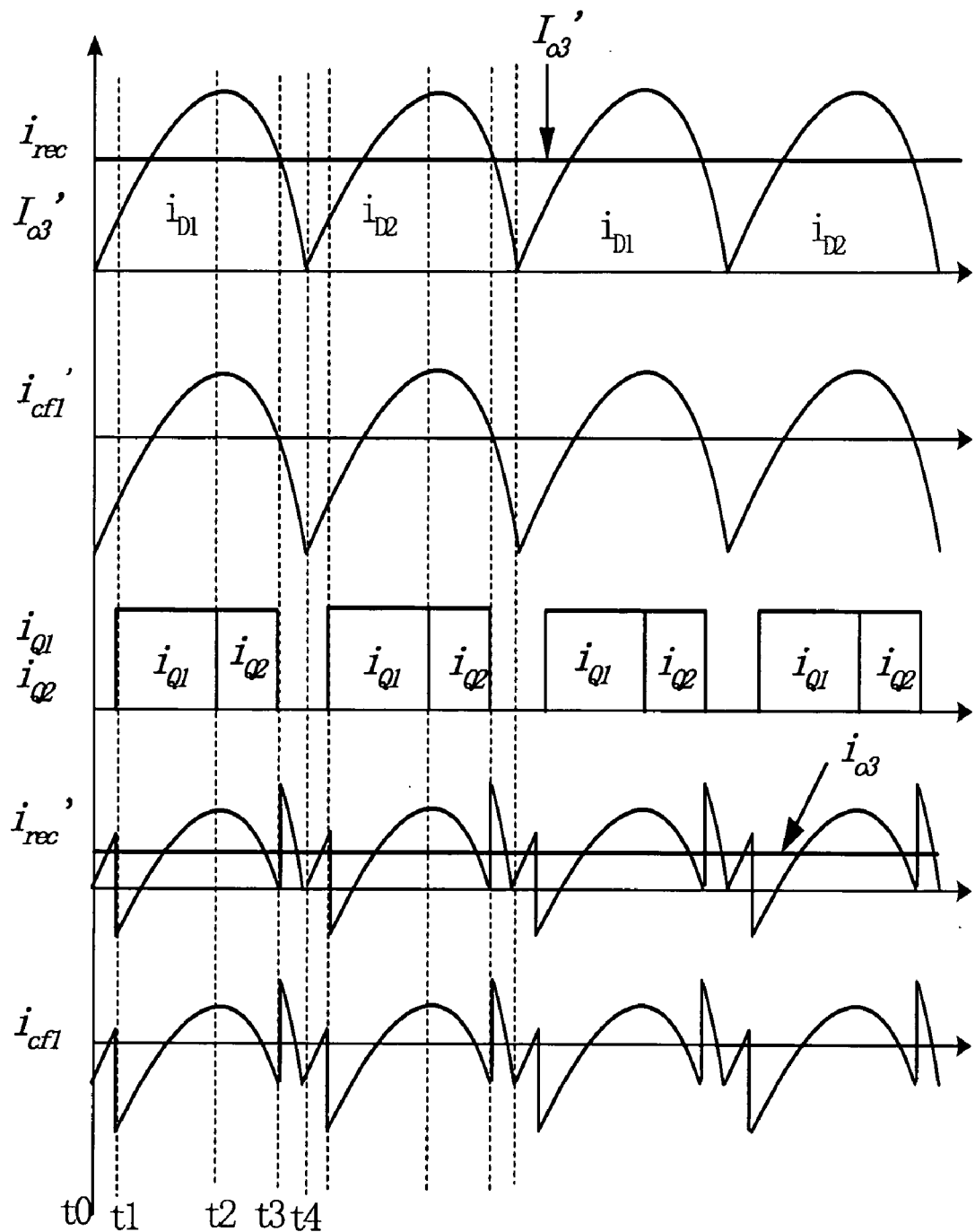
FIG. 6 illustrates a graphical representation of an alternative time delay synchronous control scheme of FIG. 3, and a current ripple reduction thereof.

Refer to FIG. 6, which illustrates an alternative time delay synchronous control scheme for the synchronous post buck converters of FIG. 3.

Furthermore, to simplify the process of the analysis under the condition of not affecting the analysis results, the input currents $i_{Q1}$ and $i_{Q2}$ of the buck switches Q1 and Q2 are deemed in a square shape. A typical situation, in which both of the buck converters have the same output currents, is showed in FIG. 6. Assuming the output power is the same as in the former situation, with no synchronous post buck converters. Furthermore, the loss in the post synchronous post buck converters is neglected. The rectified current $i_{rec}$ should be in the same shape with the same amplitude as the former.

The buck switch $Q_1$ is set to turn on at time $t_1$ with a delay time behind the time $t_0$ when the current $i_{rec}$ begins to increase from zero. At time $t_2$, the buck switch $Q_1$ turns off and the buck switch $Q_2$ begins to turn on. The switch $Q_2$ turns off at $t=t_3$ before the time $t_4$ when the current $i_{rec}$ decreases to zero. From the onset of time $t_4$, the same switching process occurs for the switches $Q_1$ and $Q_2$ in another half-wave of $i_{rec}$. Therefore, the switching frequency of the switches $Q_1$ and $Q_2$ is double that of the LLC-SRC.

From FIG. 6, it can be observed that, after currents are drawn by the switches $Q_1$ and $Q_2$ during every half wave of $i_{rec}$, a current with abundant high order harmonics $i_{rec}'$ is left to supply the third output $I_{o3}$ through the output capacitor $Cf_1$. Separated from the DC component $I_{o3}$, an AC ripple current $i_{cf1}$ is achieved from $i_{rec}'$ on the capacitor $Cf_1$. Compared with the former $i_{cf1}'$, this ripple current has a significantly reduced rms value.

This process of the ripple current reduction on the output capacitor $Cf_1$ can be illustrated by an example of a 235 W prototype, as shown in Table 1. The example has the same architecture as FIG. 3 and three output voltages: +12V for Vo3, +5.5V for Vo1 and +3.3V for Vo2. All are obtained from two synchronous post buck converters.

TABLE 1

| | Load | | | | | | | |
|---|---|---|---|---|---|---|---|---|
| | 1 | 2 | 3 | 4 | 5 | 6 | 7 | 8 |
| (Vo3) 12 V | 155 W | | | 90 W | | 0 W | | 155 W |
| (Vo1) 5.5 V | 40 W | 80 W | 14 W | 125 W | 79 W | 125 W | 79 W | 0 W |
| (Vo2) 3.3 V | 40 W | 0 W | 66 W | 20 W | 66 W | 20 W | 66 W | 0 W |

If all of the 235 W power is delivered to +12V output, the rms value of the ripple current $i_{cf1}'$ is achieved from equation (7) as:

$$I_{cf1,rms}' = 0.483 \times 235/12 = 9.46 A$$

If 79 W is distributed to the +5V output, and +66 W is distributed to the +3.3V output, it can be deduced that $I_{o1}$ is 15.8 A and $I_{o2}$ is 20 A, the rest of the power 90 W is distributed to +12V output. When the time interval between $t_0$ to $t_1$ equals to that from $t_3$ to $t_4$, the rms value of the ripple current $I_{cf1,rms}$ can be calculated as 5.34 A, which is significantly reduced from the former 9.46 A in the situation without the synchronous post buck converters.

Figure 7:
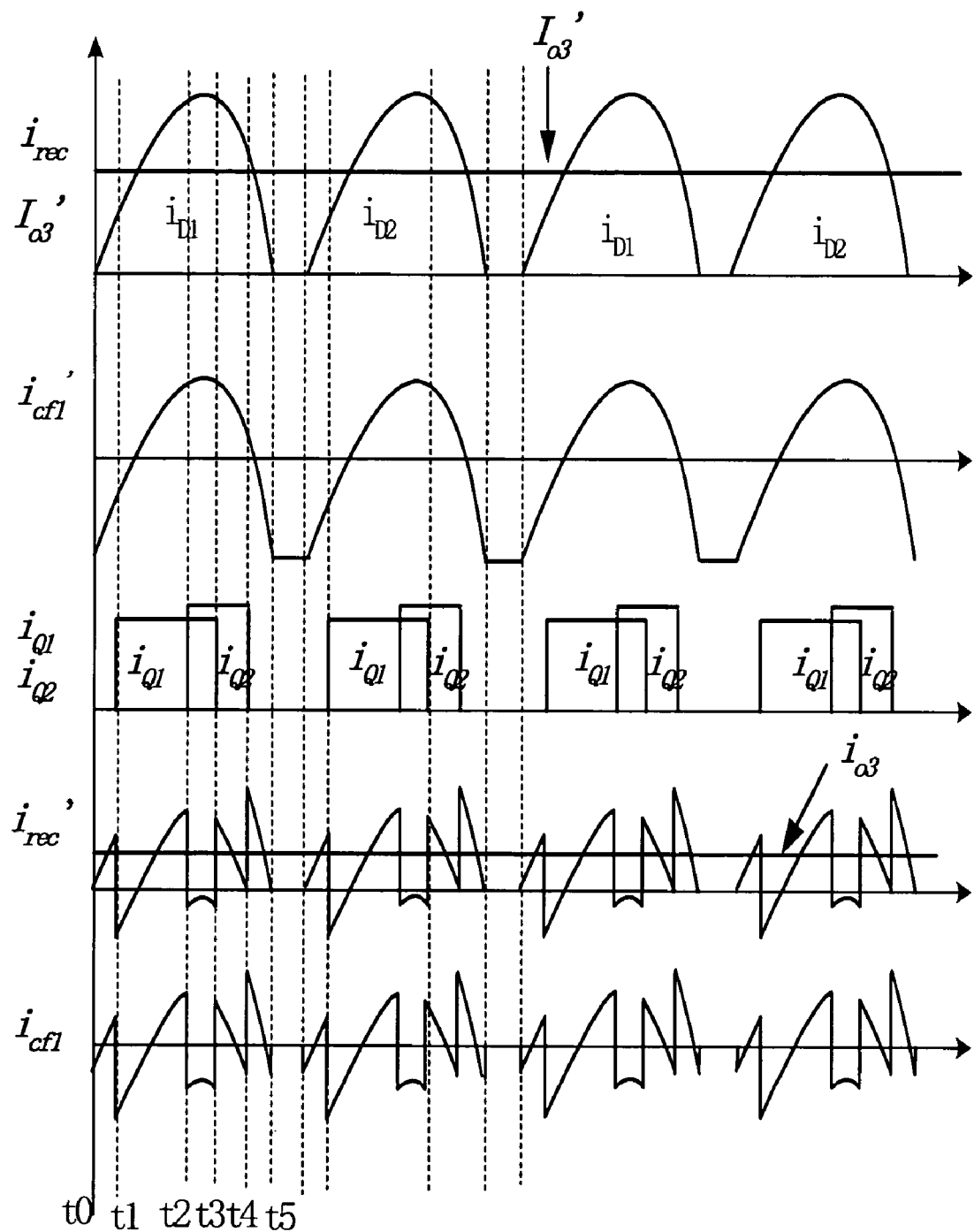
FIG. 7 illustrates a graphical representation of an alternative time delay synchronous control scheme of FIG. 3, and a current ripple reduction thereof.

In the situation when the switching frequency of LLC-SRC satisfies equation (3), the rectified current $i_{rec}$ includes a dead conduction time during the time interval from $t_1$ to $t_2$ as shown in FIG. 4. If still adopting the timing sequence shown in FIG. 6, the sum of the conduction time of $i_{Q1}$ and $i_{Q2}$ may go beyond each pulse duration of the rectified current $i_{rec}$, which will cause a significant rise for the rms value of the ripple current $i_{cf1}$. Referring to FIG. 7, to ensure the buck switch $Q_1$ and $Q_2$ to draw currents within the pulse duration of every half wave, the $i_{Q1}$ and $i_{Q2}$ may have an overlap. This implies that the switch $Q_2$ turns on at the time of $t_2$ before the time of $t_3$ when the switch $Q_1$ begins to turn off. Hence, the switch $Q_2$ can be turned off at the time of $t_4$ before the time of $t_5$ when the current $i_{rec}$ reaches zero. In this scheme of the time delay synchronous control for the two post buck converters, the rms value of the ripple current $i_{cf1}$ should also have a significant reduction compared with the former $i_{cf1}'$ from its waveform shape shown in FIG. 7.

Figure 8:
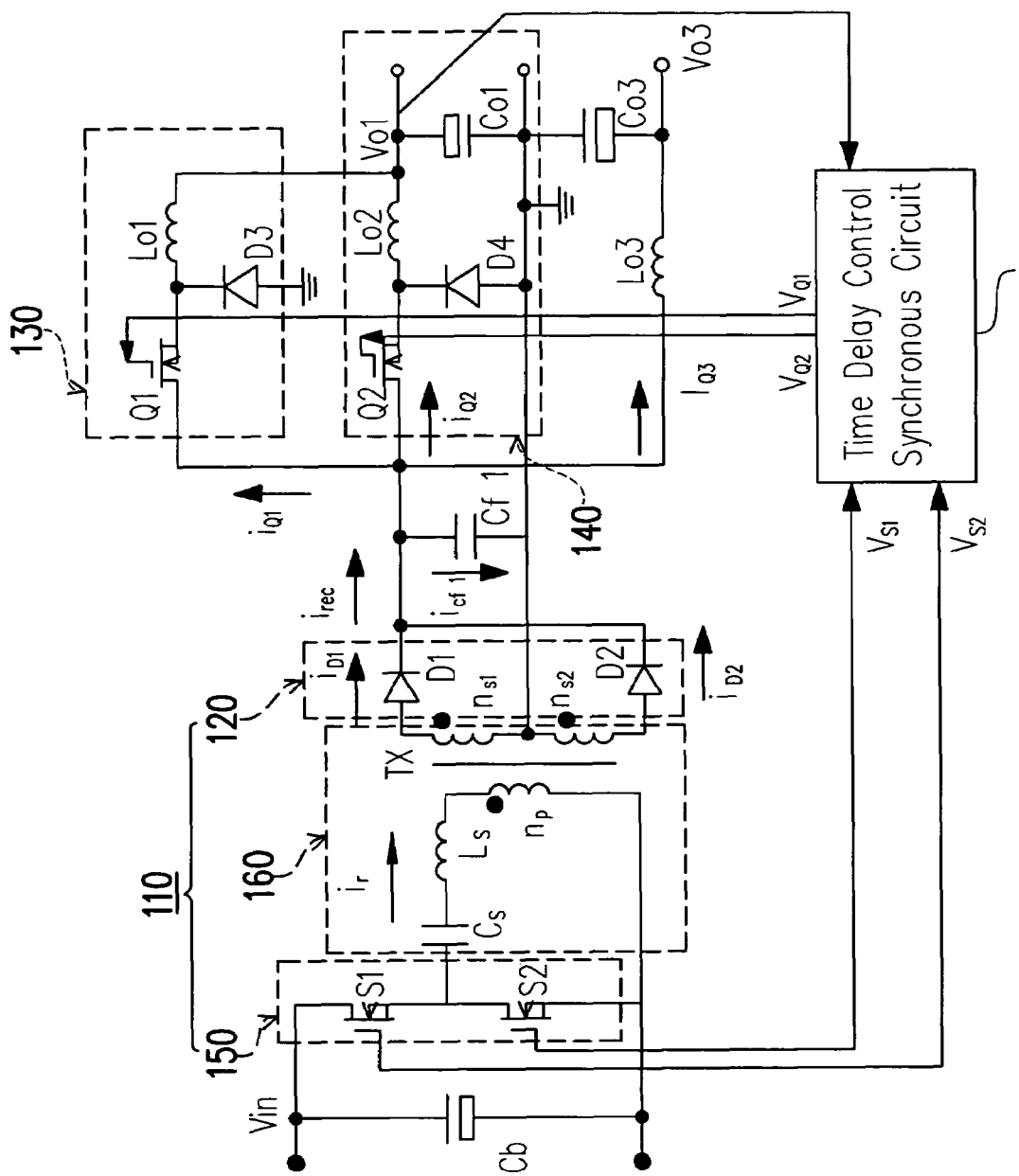
FIG. 8 illustrates an alternative embodiment of proposed power architecture using two interleaved synchronous post buck converters, in which the SMPS has a very low output voltage compared with the other output.
Figure 9:
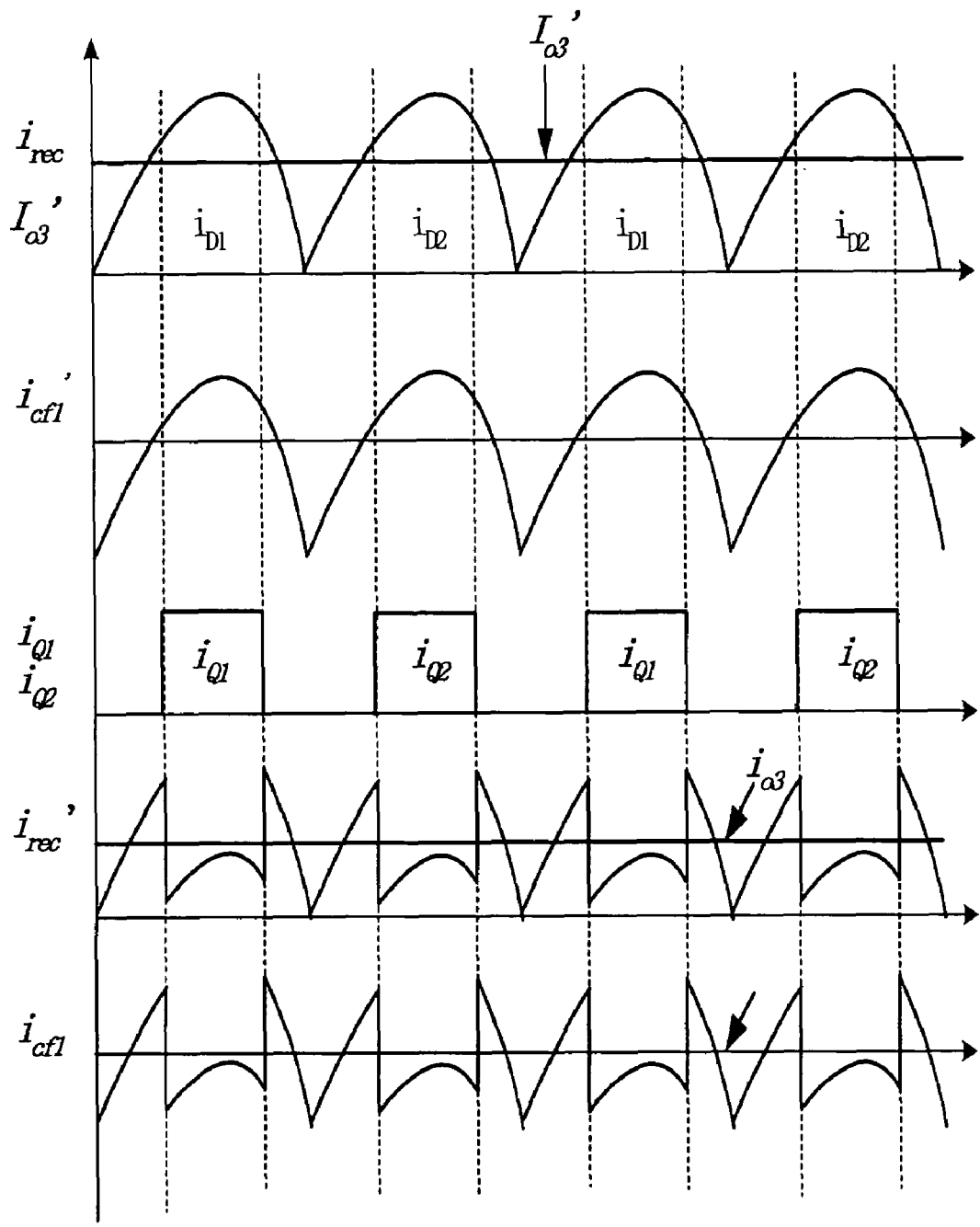
FIG. 9 illustrates a graphical representation of a time delay synchronous control scheme of FIG. 8 and a current ripple reduction thereof.

Refer to FIG. 8, which illustrates a situation when the switching mode power supply has two outputs, an output voltage Vo3 directly from the LLC-SRC 110 and an output Vo1 with a very low voltage compared with Vo3. Under such conditions, if the scheme shown in FIG. 3 is still being considered, the rms value of the output capacitor $Cf_1$ can not be reduced, because the conduction time of the buck switches Q1 and Q2 will be very narrow, and the post buck converters 130 and 140 will have a very high pulse input current. Therefore, an interleaved structure of two synchronous post buck converters 130 and 140 is adopted in FIG. 8, and the scheme of the time delay synchronous control is shown in FIG. 9.

In each half wave of the current $i_{rec}$, the buck switches $Q_1$ and $Q_2$ alternately draws the input pulse current through the output capacitor $Cf_1$ and has the same delay time from their relative half wave of $i_{rec}$. The switching frequency of $Q_1$ and $Q_2$ here is the same as that of the front-end LLC-SRC 110. The pulse width of $Q_1$ and $Q_2$ is broadened to double that in the aforementioned case. The current stress on the capacitor $Cf_1$ is thereby alleviated greatly.

Figure 10:
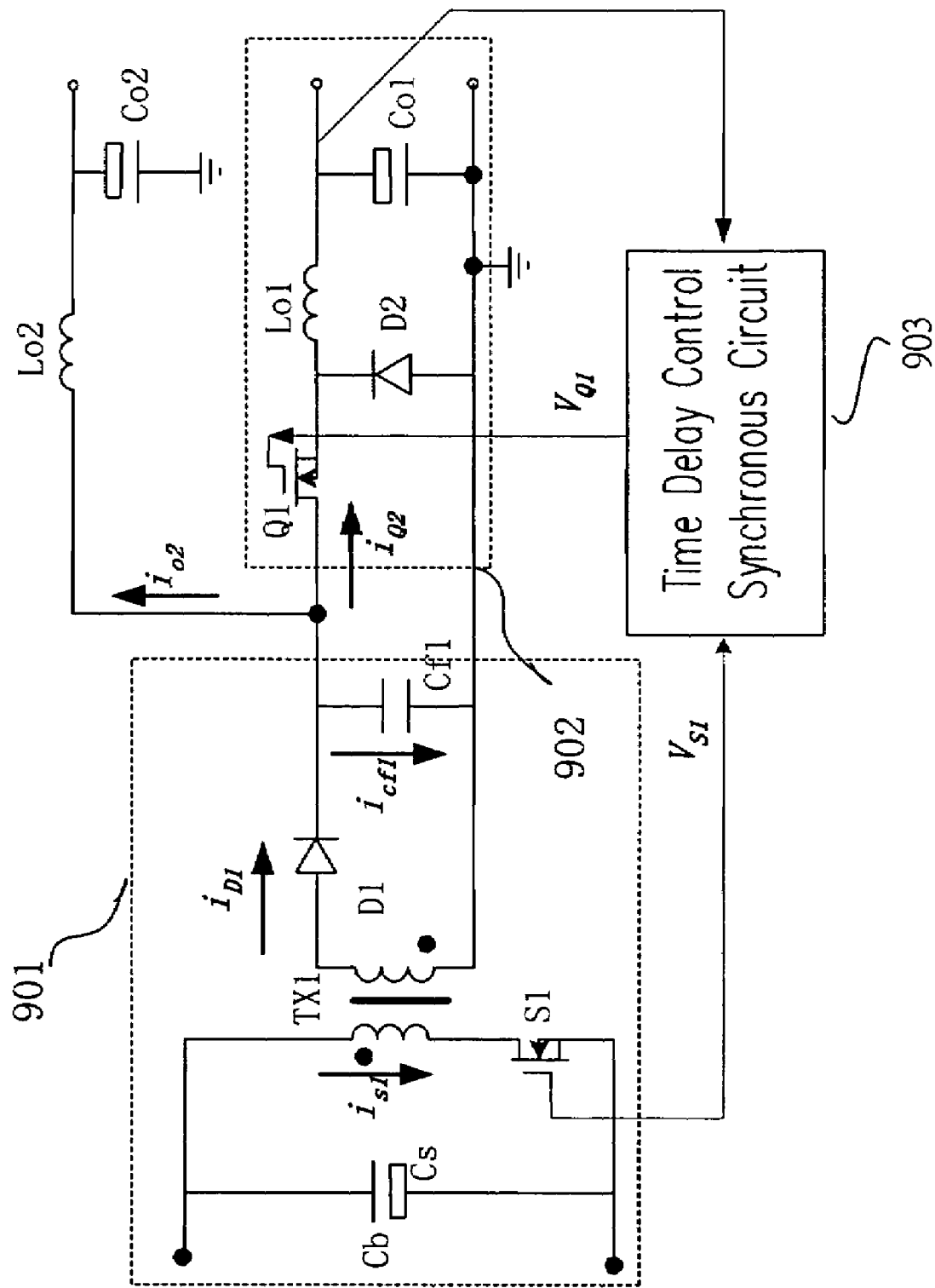
FIG. 10 illustrates an alternative embodiment of the present invention, in which a flyback converter is adopted as the front-end DC/DC converter of FIG. 2.

Refer to FIG. 10, which shows another preferred embodiment of the present invention, in which the front-end DC/DC converter is a flyback converter 901. The flyback converter includes a bus capacitor Cb, a flyback transformer $TX_1$, a main switch $S_1$, a rectifier diode $D_1$ and an output capacitor $Cf_1$, together with an output filter composed of an inductor $Lo_2$ and a capacitor. A buck converter 902, made up of a buck switch $Q_1$, a freewheeling diode $D_2$, an output inductor Lo1 and an output capacitor $Co_1$, cascades directly from the output capacitor $Cf_1$.

Figure 11:
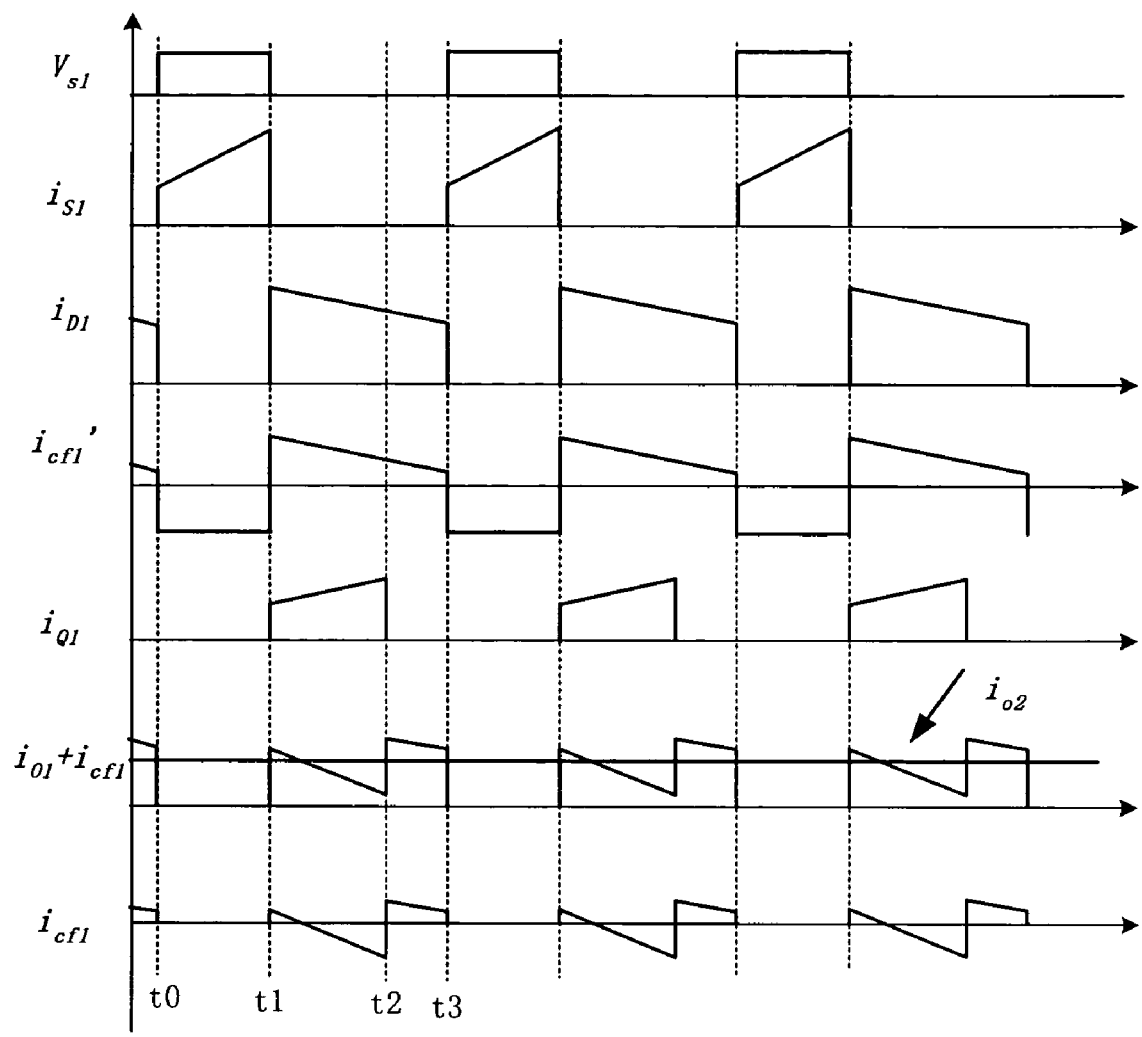
FIG. 11 illustrates a graphical representation of a time delay synchronous control scheme of FIG. 10 and a process of current ripple reduction on the output capacitor.

Refer to FIG. 11, which illustrates a scheme of the time delay synchronous control for the post buck converter 902. The buck switch $Q_1$ begins to turn on at time $t_1$ when the flyback converter has a pulse current to the output capacitor and turn off at time $t_2$ before the time of $t_3$ when the main switch $S_1$ of the flyback converter 901 turns on. Thus, as FIG. 11 shows, a final ripple current $i_{cf1}$ on the output capacitor $Cf_1$ is achieved with a significantly reduced rms value compared with the original $i_{cf1}'$ without the post buck converter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply with multiple outputs, comprising:
   a front-end converter with a current mode output;
   a first buck converter and a second buck converter, both of which cascade from a first output capacitor of the front-end converter; and
   a time delay synchronous control circuit, for controlling a delay time between the time the front-end converter begins to have a pulse current to the first output capacitor and the time the first buck converter and the second buck converter being turned on is adjusted so as to reduce the ripple current on the first output capacitor, wherein the first buck converter and the second buck converter draw pulse current from the first output capacitor during the time when the front-end converter has the pulse output current to the first output capacitor, and the front-end converter is an LLC-SRC.

2. The power supply with multiple outputs of claim 1, wherein the front-end converter comprising:
   a bridge circuit including a pair of power switches, the bridge circuit being coupled to an input voltage;
   a resonant tank, coupled to the bridge circuit, being driven by the pair of power switches; and
   a rectifier, coupled to the resonant tank, for providing the current mode output of the front-end converter from the resonant tank.

3. The power supply with multiple outputs of claim 2, wherein the rectifier is a diode rectifier or a synchronous rectifier.

4. The power supply with multiple outputs of claim 2, wherein the resonant tank comprising:
   a series resonant capacitor, coupled to the bridge circuit;
   a series resonant inductor, coupled to the series resonant capacitor; and
   a transformer with a magnetizing inductor coupled to the series resonant inductor and the bridge circuit,
   wherein the series resonant capacitor, the series resonant inductor and the magnetizing inductor constitute two characteristic frequencies of the resonant tank.

5. The power supply with multiple outputs of claim 4, wherein the series resonant inductor is a discrete component for the transformer or is replaced by the leakage inductance of the transformer.

6. The power supply with multiple outputs of claim 2, wherein the bridge circuit comprises a bus capacitor coupled to the input voltage.

7. The power supply with multiple outputs of claim 4, wherein the transformer comprising a primary winding and two secondary windings connected in series in phase, for isolating the bridge circuit and the resonant tank from the rectifier.

8. The power supply with multiple outputs of claim 2, wherein the rectifier is a full-wave rectifier comprising a first rectifier diode and a second rectifier diode connected to the output capacitor, the first and second rectifier diodes are connected through the output capacitor to an output filter to generate an output voltage of the multiple outputs of the power supply.

9. The power supply with multiple outputs of claim 8, wherein an anode of the first rectifier diode is connected to a nominal terminal of a first secondary winding of the transformer and an anode of the second rectifier diode is connected to a reverse terminal of a second secondary winding of the transformer, a connection terminal of the first and second secondary windings is connected to the output as the ground of a secondary side of the transformer.

10. The power supply with multiple outputs of claim 1, wherein after the delay time behind the time when the front-end converter begins to have the pulse output current, the first buck converter and the second buck converter are sequentially turned on and then the first buck converter is turned off after the second buck converter is turned off.

11. The power supply with multiple outputs of claim 1, wherein buck switches of both the first and second buck converters are turned off before the pulse output current of the front-end converter reaches to zero.

12. The power supply with multiple outputs of claim 1, wherein after the delay time behind the time when the front-end converter begins to have the pulse output current, the first buck converter is turned on and then the first buck converter is turned off, at the time the first buck converter being turned off, the second buck converter is sequentially turned on.

13. The power supply with multiple outputs of claim 1, wherein a dead conduction time interval exists between every two of the output current pulses of the front-end converter, the first buck converter and the second buck converter are sequentially turned on and then the first buck converter is turned off before the second buck converter is turned off, an overlap existing between the period of the first buck converter being on and the period of the second buck converter being on.

14. A power supply with multiple outputs, comprising:
   a front-end converter with a current mode output, for providing a first output of the power supply; and
   a first buck converter and a second buck converter, both of which cascade a first output capacitor of the front-end converter and the outputs of which are connected together for providing a second output of the power supply; and
   a time delay synchronous control circuit, for controlling the first buck converter and the second buck converter alternatively drawing one of the two pulse currents from the first output capacitor during the time when every two pulse of the output current of the front-end converter are provided, and during the time of each pulse of the output current of the front-end converter, only one of the first buck converter and the second buck converter drawing the pulse current from the first output capacitor, so as to reduce the ripple current on the first output capacitor, and the front-end converter is an LLC-SRC.

15. The power supply with multiple outputs of claim 14, wherein a delay time exists between the time the front-end converter begins to have the pulse output current and the time the first buck converter or the second buck converter are turned on.

16. The power supply with multiple outputs of claim 14, wherein both of the first and second buck converters are turned off before the pulse output current of the front-end converter reaches to zero.

17. A time delay synchronous control method for a power supply with multiple outputs, the power supply comprising a front-end converter with a current mode output and a first buck converter and a second buck converter, both of which cascade an output capacitor of the front-end converter, the first buck converter being controlled by a first buck switch and the second buck converter being controlled by a second buck switch, the method comprising:

adjusting a delay time between the time the front-end converter begins to have the pulse output current to the output capacitor and the time the first buck switch and the second buck switch being turned on so as to reduce the ripple current on the first output capacitor; and drawing pulse output current from the first output capacitor by the first buck switch and the second buck switch during the time when the front-end converter has the pulse output current to the first output capacitor, and the front-end converter is an LLC-SRC.

18. The time delay synchronous control method of claim 17, wherein after the delay time behind the time when the front-end converter begins to have the pulse output current, the first buck switch and the second buck switch are sequentially turned on and then the first buck switch is turned off after the second buck switch being turned off.

19. The time delay synchronous control method of claim 18, wherein after the delay time behind the time when the front-end converter begins to have the pulse output current, the first buck switch is turned on and then the first buck switch is turned off, at the time the first buck switch being turned off, the second buck switch being sequentially turned on.

20. The time delay synchronous control method of claim 17, wherein a dead conduction time interval exists between every two of the output current pulses of the front-end converter, the first buck switch and the second buck switch being sequentially turned on and then the first buck switch is turned off before the second buck switch being turned off, a overlap existing between the period of the first buck switch being on and the period of the second buck switch being on.

21. A power supply with multiple outputs, comprising:

a converter with a main switch, a rectifier and an output capacitor, wherein the converter is an LLC-SRC;

a buck converter, directly cascading the output capacitor of the converter, wherein the buck converter is controlled by a buck switch, the buck switch begins to turn on at the time when the converter has a pulse current to the output capacitor and turn off at the time before the time when the main switch turns on; and a time delay synchronous control circuit, for controlling a time the converter begins to have a pulse current to the output capacitor and a time the buck converter being turned on so as to reduce the ripple current on the output capacitor.

22. The power supply of claim 21, wherein the rectifier is a diode rectifier or a synchronous rectifier.

* * * * *